United States Patent [19]
Tsuchiya et al.

[11] 4,225,644
[45] Sep. 30, 1980

[54] LOW TEMPERATURE HEAT-SEALABLE BI-AXIALLY ORIENTED POLYPROPYLENE COMPOSITE FILM AND PROCESS FOR PRODUCTION THEREOF

[75] Inventors: Mikio Tsuchiya, Shiga; Takashi Kawamura; Kazuo Ootaka, both of Mitomachi; Yukio Ozaki, Shiga, all of Japan

[73] Assignee: Honshu Seishi Kabushiki Kaisha, Tokyo, Japan

[21] Appl. No.: 956,347

[22] Filed: Oct. 31, 1978

[30] Foreign Application Priority Data

Oct. 18, 1978 [JP] Japan .................................. 53-128204

[51] Int. Cl.³ ............................................. B32B 7/02
[52] U.S. Cl. ................................. 428/215; 156/163; 156/164; 156/229; 156/249; 156/305; 427/322; 427/173; 427/393.5; 428/334; 428/411; 428/516; 428/910; 264/134; 264/241; 264/389.3
[58] Field of Search ............... 428/516, 215, 334, 411, 428/910; 156/163, 164, 305, 229, 249; 427/385

[56] References Cited
U.S. PATENT DOCUMENTS

| | | | |
|---|---|---|---|
| 2,897,170 | 7/1959 | Gruber | 428/375 X |
| 3,887,745 | 6/1975 | Yoshii et al. | 428/516 X |
| 4,117,193 | 9/1978 | Tsuchiya et al. | 428/516 X |

Primary Examiner—Marion McCamish
Attorney, Agent, or Firm—Frishauf, Holtz, Goodman & Woodward

[57] ABSTRACT

A novel type of low temperature heat-sealable bi-axially oriented polypropylene composite film and a process for the production thereof are disclosed. The composite film is characterized by having on at least one of the outer surfaces thereof a uni-axially or bi-axially oriented extremely thin continuous layer of a primary higher fatty acid amide or an N-substituted higher fatty acid amide formed through the sequential coating and orientating, and it shows well-balanced excellence in all properties required for such films including lubricity, anti-blocking property, anti-scratch property and low temperature heat sealability.

24 Claims, 2 Drawing Figures

LOW TEMPERATURE HEAT-SEALABLE BI-AXIALLY ORIENTED POLYPROPYLENE COMPOSITE FILM AND PROCESS FOR PRODUCTION THEREOF

BACKGROUND OF INVENTION

The present invention relates to low temperature heat sealable, biaxially oriented polypropylene composite films having improved lubricity, anti-blocking properties and scratch resistance.

Biaxially oriented crystalline polypropylene films are known to possess a number of advantageous characteristic properties including excellent optical properties such as transparency and brilliance, satisfactory mechanical properties such as tensile strength and Young's modulus, exceptionally low vapor-permeability, and substantial non-toxic and odorless properties, and accordingly they are widely used as packaging material, particularly for foods. However, the biaxially oriented crystalline polypropylene films have defects in that as a single substance they exhibit rather poor heat sealability and even if they are heated to a temperature which enables their heat-sealing, they cannot usually provide a satisfactory level of heat-sealing strength. In addition, when they are heat-sealed, wrinkles due to heat shrinkage usually appear on the surface. Such wrinkles spoil the appearance of an article which is wrapped with such a film and decrease the value of the same as an article of commerce.

To obtain improved films free from such defects, a variety of trials have been made heretofore. Representative examples of such trials include the application of a readily heat-sealable resin to one or both surfaces of said biaxially oriented crystalline polypropylene film by such means as: (1) by a partial coating method; (2) from a solution or an emulsion of the coating resin; (3) by a dry laminating method; (4) by a melt extrusion laminating method, or the like. However, none of these trials has provided fully satisfactory results, because these methods also are not free from various problems: with the application of a coating layer, there is a problem of a substantial cost increase due to the use of an additional process step; with the use of organic solvents there are such problems as how to recover the used solvent, how to avoid pollution of the working atmosphere; the dietary hygiene problem and others. Accordingly, various other processes for obtaining biaxially oriented polypropylene films with satisfactory characteristic properties without using such organic solvents as mentioned above and without special treatment to the surface of the films have been proposed and tried. For example, there are many known processes for the production of bi-axially oriented polypropylene composite films comprising the steps of laminating a specified resin given hereinbelow on at least one surface of the substrate film before the resulting laminated film is either uni-axially or bi-axially oriented. The resins to be used for such purpose include, for example, ethylene-propylene copolymer as disclosed in Japanese Patent Publications Nos. 39275/72 and 14343/74; middle or low density polyethylene and ethylene-vinyl acetate copolymer as disclosed in Japanese Patent Publication No. 11353/66; ionomer resin as disclosed in Japanese Patent Publication No. 40793/71; syndiotactic 1,2-cis-polybutadiene as disclosed in Japanese Patent Publication No. 50068/77; ethylene-(1-butene)copolymer as disclosed in Japanese Patent Public Disclosures Nos. 109577/77, 104585/77, and 12971/77, etc.

From the viewpoint of heat sealability of these resins, ethylene-vinyl acetate copolymer, ionomer resin, syndiotactic 1,2-cis-polybutadiene, and ethylene-(1-butene)-copolymer can provide a practically acceptable sealing strength at a temperature of 100° C. or lower, while middle or low density polyethylene provides a practically acceptable level of heat sealing strength at a temperature of 100°-130° C. and ethylenepropylene copolymer provides such heat sealing strength at a temperature of 130°-150° C.

From the viewpoint of packaging machine suitability, a composite film should preferably provide an acceptable heat sealing strength at a temperature of 100° C. or lower. However, resins such as ethylene-vinyl acetate copolymer, ionomer resin and syndiotactic 1,2-cis-polybutadiene have poor heat resisting properties and readily deteriorate owing to cross-linking, deacetylation, etc. In addition, they have poor compatibility with polypropylene resin. Accordingly, if they are added to polypropylene resin, the physical properties such as appearance and transparency of the polypropylene film prepared therefrom will be impaired substantially, and as a result, the value of merchandise made from or packaged with the final film product will be decreased significantly. Accordingly, if these resins are used as laminating resins, trimmings and/or defective film products obtained from these laminating resins cannot be recycled. Namely, they cannot be added to a raw material polypropylene from which a substrate film is prepared, because they have the defects mentioned above, and since the recycling is impossible for these reasons, the cost of production increases.

Resins which are heat-sealable at a temperature of 100° C. or lower are generally tacky and have a low melting point and low crystallinity. Therefore, they have rather poor lubricity and poor anti-blocking properties, and do not always have satisfactory scratch resistance. So, it is difficult to use these resins as a single substance in the practical film production process. By incorporating various known additives such as a lubricant (such as a higher fatty acid amide), an anti-blocking agent (such as silica) and a resin selected from polyolefinic and other resins, such defects as mentioned above have been remedied to a certain level and, accordingly, for some specific uses, satisfactory films have been obtained. In general, however, films having a satisfactory balance of various characteristic properties has not yet been obtained.

In contrast, resins such as ethylene-(1-butene)-copolymer, middle and low density polyethylenes and ethylene-propylene copolymer have rather good compatibility with polypropylene as well as rather good heat stability. Therefore, when these resins are used, recycling is possible within a certain limit, and for this reason their influence on the cost of production is not so serious. However, since ethylene-(1-butene)copolymer is also a tacky resin having a low melting point and low crystallinity, it is not free from the same or similar defects as mentioned previously with respect to the aforementioned low melting resins. In addition, since middle and low density polyethylenes and ethylene-propylene copolymer have a higher heat sealing temperature and a narrower heat sealable temperature range, they do not fit well into the usual operational sequence when used in a high-speed automatic packaging process.

As is obvious from the above explanations, the various trials for improving the heat-sealability of a polypropylene film by laminating a readily heat sealable resin layer on one or both surfaces of the polypropylene substrate film have not yet been fully successful.

In view of these circumstances, we have studied from every point of view the problem as to what kind of a readily heat sealable resin should be selected and how it should be laminated on the polypropylene substrate film. We have changed the types of laminating resins and the thicknesses of the lamination layers. We have changed the kinds and amounts of the additives to be incorporated in the laminating resins such as lubricants, anti-blocking agents, antistatic agents and the like. And yet, we have found that it is very difficult to improve the heat sealability of an oriented crystalline polypropylene film without impairing its many advantageous intrinsic characteristic properties and obtain a polypropylene composite film which has well-balanced excellence in all properties—lubricity, anti-blocking property, anti-scratch property and low temperature heat sealability.

As a result of our very earnest study, however, we have finally accomplished the present invention relating to a novel process for the production of low temperature heat sealable polypropylene composite films having improved lubricity, improved anti-blocking properties and improved scratch resistance in addition to excellent suitability for a high speed automatic packaging operation. Thus, the process of our invention ensures a substantial reduction in cost of production without impairing superior characteristic properties such as superior transparency, superior brilliance, superior mechanical properties and the like, which are intrinsic to bi-axially oriented polypropylene films.

THE INVENTION

The polypropylene composite film which is obtained according to the present invention by applying a coating layer of a higher fatty acid amide on at least one surface of the polypropylene composite film and then orientating the thus coated film shows a heat sealing strength of 600–800 g/25 mm (at 95° C.) or higher as measured in the thickness of 30 microns which is the same level as the thickness of the most common similar prior art film having no layer of such a higher fatty acid amide as mentioned above. Both the static and kinetic frictional coefficients of the same film are within the range of 0.05–0.20 and the blocking strength thereof is 0.10 kg/15 cm$^2$ or less. Even after one month or longer storage, no blocking occurs, no matter whether the film is in a roll or in sheets of stacked flat film. Anti-scratch properties are also remarkably improved. Also, it has been confirmed that with the film of this invention, the chance of getting scratches in the process of automatic wrapping operation has been reduced and the film has satisfactory lubricity after packaging.

Methods of improving various desired properties of a film product by applying thereto a surface coating of a higher fatty acid amide selected from those as mentioned above singly or in a mixture with an anti-static agent and/or other one or more agents have already been known. However, it has not been known yet that the desired properties such as lubricity, anti-blocking properties and anti-scratch properties of a crystalline, bi-axially oriented polypropylene composite film can be remarkably improved without impairing the activity of the amide specifically used and the intrinsic favourable properties of the polypropylene substrate film only by applying thereto a specific surface coating layer and then uni-axially or bi-axially orientating the thus coated film in a heating zone at a temperature which is equal to or higher than the melting point of the amide specifically used.

The reason why such unexpected remarkable improvement is obtained is not fully known, but it is believed that due to the unique treatments contained in the process of our invention such as, for example, (1) uni-axial or bi-axial orientation of the coated layer of the higher fatty acid amide which is carried out after the step of coating, and (2) substantial heat treatment of said coated layer being carried out in the step of orientation under applied heat, a certain proper degree of thermal decomposition of the coated layer occurs and an extremely thin stable continuous layer such as within the range of 0.1–0.01 micron or less of said higher fatty acid amide is formed on the surface of the film. In the case of conventional processes wherein such coating layer was applied to the finished film product in an independent step different from the process of preparing the same film, the formation of such an extremely thin layer as mentioned above would be impossible. It is believed that due to the formation of such an extremely thin continuous layer of higher fatty acid amide according to the process of our invention, various defects common to the prior art polypropylene composite films can be eliminated without impairing the desirable characteristic properties intrinsic to said polypropylene composite films.

It is also surprising to find that said unexpected effects remain for a very long time in spite of the fact that said higher fatty acid amides themselves do not have film-forming properties nor is there is any chemical linkage between such higher fatty acid amide and the surface of the film on which the same higher fatty acid amide is coated. That is, the higher fatty acid amide only adheres to the surface of the composite film, and yet the above-mentioned improvement in various characteristic properties of the film is maintained for a long time very steadily. This is because the adhesion of the coated layer of the higher fatty acid amide to the surface of the film has been remarkably improved as a result of said orientation which has been carried out after the application of the same coated layer to the surface of the film.

It is natural to consider that the adhesion will be unsatisfactory when material such as the higher fatty acid amide is only coated on the surface of the film. Unexpectedly, however, we have found that as a result of the orientation of the film on the surface of which a layer of the higher fatty acid amide is only coated, the adhesion between said film and said coated layer of the higher fatty acid amide has been extremely improved, and except for some very special cases wherein the film is used under such conditions that the coated layer of the higher fatty acid amide is inevitably scraped off, there is no problem with respect to the stability of the coated higher fatty acid amide layer.

When a primary higher fatty acid amide is employed, the improvement in the desired characteristic properties of the product films is better if the number of carbon atoms contained in said primary amide is larger. Saturated amides generally having a relatively high melting point are superior to unsaturated amides. When the temperature of orientation is within the range of 130°–180° C., saturated amides exhibit a slightly better thermal stability than unsaturated amides, N,N'-methylene-bis-amides and N,N'-ethylene-bis-amides will exhibit still better thermal stability. As regards the improvement in lubricity and anti-blocking properties, particularly in the latter, the use of unsaturated primary amides will give the best results, and saturated primary amides and N-substituted amides follow in this order. Accordingly, it is the most important factor to properly select the specific types of amides in view of the end purposes of the respective film products.

A higher fatty acid amide having the generic formula: $RCONH_2$, wherein R represents $C_nH_{2n+1}$ wherein n is an integer of 13-21 and having an iodine value of 90 or less, a melting point of 50°-120° C., the number of carbon atoms of 14-22, and the molecular weight of 200-340 can be used conveniently for said purpose in the practice of the present invention.

Another type of higher fatty acid amide, that is, an N,N'-methylene-bis-amide or an N,N'-ethylene-bis-amide having the generic formula of $(R'CONH)_2CH_2$ or $(R'CONH)_2C_2H_4$, wherein R' represents $C_nH_{2n+1}$, wherein n is an integer of 9-21, and having a melting point of 118°-160° C., the number of carbon atoms of 21-46, and the molecular weight of 350-690 can also be used for the same purpose conveniently in the practice of the present invention.

More particularly, an amide selected from the group consisting of erucic amide, stearic amide and N,N'-ethylene-bis-stearic amide can be used for said purpose most conveniently in the practice of the present invention.

Referring now to the methods of application and the amounts of these amides to be used in a practical process, since these amides are generally solid at a normal temperature and are not readily soluble in any solvent, the simplest method is to heat a mixture of the amide with a solvent thereof to a temperature which is equal to or above the melting point of the amide used and then apply the resulting solution to the films by the conventional coating techniques such as, for example, (1) a coating method such as those making use of an apparatus such as a kiss coater, a roll coater, a gravure coater, an air-knife coater, a rod coater, or alternatively, a spraying method wherein a solution of the amide is sprayed maintaining it at a temperature within the range in which crystallization of the dissolved amide will not occur.

When an especially small amount is to be applied, the use of a gravure coater or spraying will be the most convenient method for obtaining the desired coating.

Useful solvents which can be used in the practice of the above-mentioned solvent-using methods include ketones, esters, alcohols, turpentine and fatty acids, provided that the amides used are the primary higher fatty acid amides. However, in view of their speedy vaporization during the step of orientation, alcoholic solvents such as methanol, ethanol, n-propanol, isopropanol and n-butanol are preferred. It is preferable to select those solvents having a boiling point which is near the melting point of the amide specifically employed. The concentration of the amide in the solution must be such that the coating ensures the desired degree of lubricity. The actual concentration can vary depending on the coating method specifically employed, but in general good results can be obtained by using a 5-70% by weight solution of amide. Since N-substituted amides are high-melting, solvents for the same should be high-boiling. The most preferred solvents include kerosine, xylene, turpentine, n-butanol, methyl cellosolve, and the like.

Since the temperature in the heat treatment in the orientation step is within the range of 130°-180° C., the use of a high boiling solvent having a boiling point beyond said temperature range may allow the solvent used to remain on the surface of or inside the product film. Even when such proper solvents as mentioned above are employed, it is recommended to use a solution having the highest possible concentration of amide in order to ensure the ready evaporation of the solvent after coating. It is also possible to apply the amide without any solvent, for example, by heating the amide to a temperature higher than its melting point and applying the molten amide in the same way as the known hot-melt type coating method. N-substituted amides such as N,N'-methylenestearic acid amide can be changed to an emulsion form with the aid of a nonionic or cationic emulsifier and then the resulting emulsion can be used for coating on the surface of a film according to the procedures as mentioned above.

According to the coating methods mentioned above, a higher fatty acid amide can be coated on the surface of a film to provide thereon a coating layer of said amide at a rate in bone dry basis of 0.1-7.0 g/m² followed by uni-axially or bi-axially orientating the coated film, and as a result, the above described advantages of the invention are obtained. A coating of less than 0.1 g/m² on the same basis as mentioned above will not bring about the advantages of the invention. The coating in the range of 0.1-0.2 g/m² also will not provide a satisfactory result. This is particularly true when the material to be packaged is heavy, or high-speed packaging is to be carried out, because the thermal stability of the primary higher fatty acid amides in the step of orientation is poor and N-substituted amide is also relatively poor in its original lubricity. Coating in a thickness of more than 7.0 g/m² is too much. Too thick a coating not only spoils the appearance of the coated film but also makes the packaged material too slippery for handling by an automatic packaging machine, or for handling in the processes after the packaging process. Namely, too thick a coating results in poor workability. If a relatively thick coating is applied, one within the range of 5.0-7.0 g/m², the surface of the coated film will keep the feeling intrinsic to amide compounds and the transparency of the film will be impaired. For these reasons, the preferred coating amount has been determined to be within the range of 0.3-5.0 g/m² on a bone dry basis.

The coating the thickness of which is within the range as shown above will provide remarkable improvement in the characteristic properties such as coefficient of friction, anti-blocking properties, scratch resistance and the like. Such a coating will also make possible the production of the best film products from the viewpoints of both packaging suitability and a long-term stability of the film products. Thus, the level of coating given above is considered to be the best range for such coating.

As additional advantages, the film of the present invention usually gets a very small amount of electric charge from frictional contact, because the coefficient of friction on the surface of the film is very small. Namely, the films thus made show very good anti-static properties and accordingly, they are very suitable for high-speed automatic packaging, high-speed automatic bag making and printing. For these reasons, in the practice of our invention, the amount of anti-static agent required for obtaining satisfactory anti-static properties is generally much smaller as compared with the amount required by the prior art films. For some uses, even no addition is satisfactory. Thus, the process of our invention can also contribute to lowering the production cost.

In a certain preferred embodiment of the present invention, there is provided a two-layer composite film which comprises a polypropylene substrate layer and one lamination layer of ethylene-butene copolymer or a resin mixture comprising ethylene-butene copolymer laminated on one surface of said substrate layer. In another preferred embodiment of the present invention, there is provided a three-layer composite film which comprises a polypropylene substrate layer, two lamination layers each comprising ethylene-butene copolymer or a resin mixture comprising ethylene-butene copolymer, said lamination layers being laminated on both sides of the substrate layer, respectively.

The total thickness of the two-layer low temperature heat-sealable bi-axially oriented polypropylene composite films of the present invention is generally between about 10 and 100 microns, and more preferably between about 15 and 60 microns. The one laminated ethylene-butene or ethylene-butene containing resin layer is preferably between about 0.5 and 10 microns, and more preferably between about 1.0 and 6.0 microns. There is no specific limitation with respect to the ratio of the thickness of the polypropylene substrate layer to the lamination layer so long as the above-mentioned requirement are fulfilled. However, particularly in the case of very thin composite films, the polypropylene substrate layer should occupy at least 50% of the total thickness of the composite film.

Similarly, the total thickness of the three-layer low temperature heat sealable bi-axially oriented polypropylene films is generally between about 10 and 100 microns, and more preferably between about 15 and 60 microns. Each of the two laminated ethylene-butene or ethylene-butene-containing resin layers is preferably between about 0.5 and 10 microns, and more preferably between about 0.8 and 4.0 microns.

As regards the ratio of the thickness of the polypropylene substrate layer to each of the two lamination layers, the same is true as mentioned above with respect to the two-layer low temperature heat sealable bi-axially oriented polypropylene composite films.

The polypropylene composition used to form the polypropylene substrate layer may consist of propylene homopolymer and/or copolymers of propylene with one or more monomers so long as the copolymers have an extraction residue determined in boiled heptane of 85% by weight or higher and at least 90% by weight of the copolymer component is propylene.

The ethylene-butane copolymer which can be used in the practice of the present invention may comprise 1-50% by weight of butene-1.

The resin mixture comprising ethylene-butene copolymer which can be used in the practice of the present invention may be a mixture of said ethylene-butene copolymer with one or more resins such as (middle density) polyethylene, ethylene propylene copolymer, etc. The ethylene-butene copolymer may occupy the range of 20-60% by weight of the resin mixture.

There is no fear that printing suitability may be impaired or the adhesion of printing ink may be decreased as a result of the formation of the continuous layer of the higher fatty acid amide on the surface of the film, because in the case of the present invention, the coated layer of an amide is extremely thin. Thus, the film of the present invention can be handled in the same way as in the case of a conventional bi-axially oriented polypropylene film. Both types of ink: "ink for the corona treated surface" and "ink for the non-corona treated surface" can be used entirely in the same way as in the cases of the ordinary prior art processing.

Figure 1:
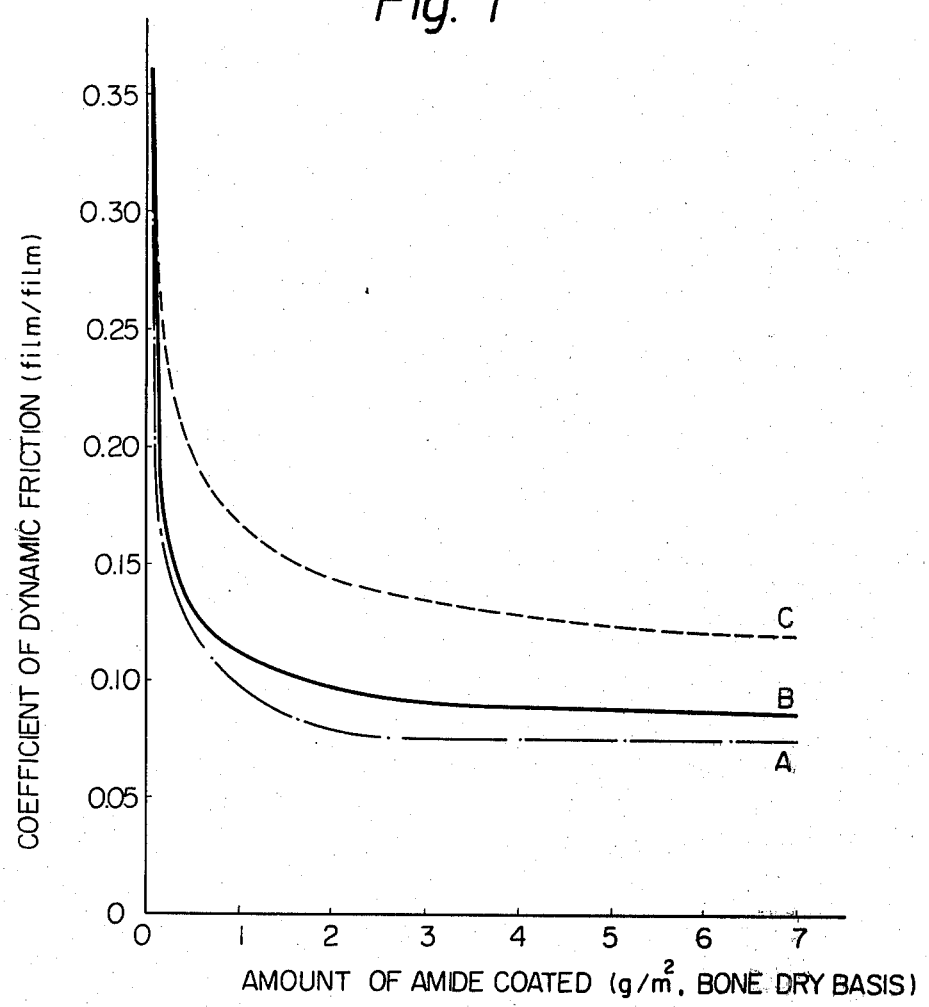
FIG. 1 shows the relations between the amounts of higher fatty acid amides coated on the surface of the uniaxially oriented laminated sheets and the coefficients of dynamic friction of the bi-axially oriented composite film products.

The present invention will be explained in more detail by the following examples. Methods of measurements of various testing items are given below in advance to the results of the experiments.

In the following Comparative and Working Examples, the determination of the characteristic properties of the product film such as haze, lubricity, anti-static properties, heat-seal strength, blocking strength, real-up blocking strength, scratch resistance, high speed packaging suitability (high speed lublicity), wet surface tension and the like, were carried out by the following methods.

(1) Haze

The haze was determined by the methods defined in JIS K-6714 and K-6718 using a haze meter available from NIHON DENSHOKU KOGYO CO., LTD.

(2) Lubricity (Coefficients of static and dynamic frictions)

The lubricity was determined by the methods defined in ASTM D-1894 (B-method) using the measuring apparatus, TENSILON, available from TOYO BALDWIN CO., LTD.

(3) Anti-static properties

Ratio of electrostatic decay (%): The film was left for 24 hours in an atmosphere having a temperature of 20° C. and 65% RH, and then it was charged at 6 KV for 1 minute using "STATIC HONESTMETER" available from SHISHIDO SHOKAI CO., LTD., followed by discharging for 30 seconds before said ratio of electrostatic decay was determined.

Potential of frictional charge (V): The film was left for 24 hours in the same atmosphere as mentioned above and then the maximum amount of contact frictional charge obtained by the contact of said film and the gauze (Japanese Pharmacopeia) for 1 minute was measured using a static charge tester, "ROTARY STATIC TESTER" available from KOA SKOKAI CO., LTD. The gauze used was 25 mm wide and 150 mm long, tension at the time of measuring being 500 g weight/25 mm, and the rotary drum speed was 400 rpm.

(4) Heat-seal strength (g/25 mm)

Pressure of 2 Kg/cm$^2$ was applied to the contacting surfaces to be heat sealed, each 25 mm wide, for 0.5 second by a "MULTI-TEMPERATURE LEVEL HEAT SEALER" available from TOYO SEIKI CO., LTD. and the thus heat-sealed surfaces were left for 24 hours in an atmosphere at 20° C. and 65% RH. Then, the force required for peeling was measured at a peeling rate of 300 mm/min. (T-shape peeling) with "TENSILON" available from TOYO SEIKI CO., LTD.

(5) Blocking strength (Kg/15 cm$^2$)

Test pieces of film each 25 mm × 100 mm in size were prepared by random sampling and two of them were placed in contact with each other so that the surfaces to be tested were face to face, the overlapping portion being 25 mm × 60 mm. The two strips of film were left in an atmosphere of 60° C. and bone dry state for 24 hours under applied pressure of 2 Kgs. After that, the two strips of film were left in an atmosphere of 20° C. and 65% RH for 24 hours and then the force required for their peeling was measured in the same manner as mentioned above with respect to the measurement of heatseal strength.

(6) Reel-up blocking strength (Class)

The reel-up film 400 mm wide and 1000 m long prepared by cutting the film produced was left in an atmosphere of 40° C. and bond dry state for a weak and then the reel-up film was cut into two, along the diameter of the circle of the rolled film in the vertical direction against the plane of the circular cross section of the rolled film.

The sheets of film in each of the hemispherically stacked half-rolls were peeled from the stack one by one and the resistance to peeling was evaluated and ranked according to the following evaluation standard:

Class 1: The film were easily peeled off the half-roll of stacked sheets with little effort;

Class 2: Plate-formation by blocking (tight gathering of stacked sheets of film) was not observed, but a certain degree of peeling resistance was detected;

Class 3: Plate-formation by blocking was not observed, but a significant degree of peeling resistance was detected and peeling was accompanied with a tearing-loose sound.

Class 4: Some plate-formation by blocking was observed, and the tearing-loose sound was loud.

Class 5: Plate-formation was complete. Separating the sheets of film one by one was impossible.

(7) Scratch resistance

In an atmosphere of 20° C. and 65% RH, the surfaces of the two films to be tested were rubbed against each other using "GAKUSHIN-TYPE ABRADER" available from FUKUDA KIKAI KOGYO CO., LTD. designated in JIS L 0849. After that, the amount of haze caused by the abrasion was examined with respect to each of the contacting surfaces using said haze meter, to determine the degree of resistance to scratching.

In more detail, a test strip of film 30 mm wide and 220 mm long was fixed on the pedestal and another test strip of film 50 mm wide and 140 mm long was fixed on the reciprocating (moving) part of the abrader. The moving part was moved to make a reciprocating motion 100 mm long at a rate of 30 reciprocations per minute for a total of 50 reciprocations and then the amount of haze of the film fixed on the moving part (frictioner) was examined. During reciprocation, the moving part was loaded with a weight of 1000 g.

(8) High speed packaging suitability (High speed lubricity)

To evaluate the lubricity of the surface of each film product during the time when the film was being heat sealed on the surface of a hot plate, or the lubricity of the film after packaging, the following experiments were carried out.

A stainless-plate (JIS SUS 304) having a built-in heater 20 cm wide and 100 cm long was fixed in such a manner that the surface of the plate was inclined 15 degrees. A box of caramels 45 mm wide, 70 mm long, 20 mm high and 50 g in weight was prepared. A piece of film to be tested was used to wrap the box filled with caramels in such a manner that the whole rectangular surfaces of the box except the two smallest rectangles (top and bottom) were covered with a sheet of the film 70 mm wide. The box of caramel thus wrapped with the film to be tested 70 mm wide was made to slide down from the top of the sloped plate to the bottom of the same along the sloped surface. It was examined how many times the box of caramel could slide dowm completely from the top to the bottom along the sloped surface at an average sliding speed of 5 cm/sec or higher. In one experiment, the temperature of the surface of the sloped stainless plate was room temperature (20° C.), in the other experiment, the temperature of the same surface was 80° C. Based on the number of times thus measured, the lubricity was ranked as follows. As a standard sample, MST cellophane #300 was used. The number of times of said complete sliding measured for this standard sample according to the above-mentioned method was 30 or more for room temperature experiment and the number of times for the same sample measured at 80° C. was 5. The lubricity thus measured with respect to each film sample was ranked by the following four classes and designated by the four different symbols as shown below:

x . . . less than 5 times (room temp.); no sliding (80° C.);

Δ . . . 5–10 times (room temp.); no sliding (80° C.);

O . . . 10–30 times (room temp.); 3–5 times (80° C.);

⊙ . . . more than 30 times (room temp.); more than 5 times (80° C.) (equal to or better than MST cellophane)

Figure 2:
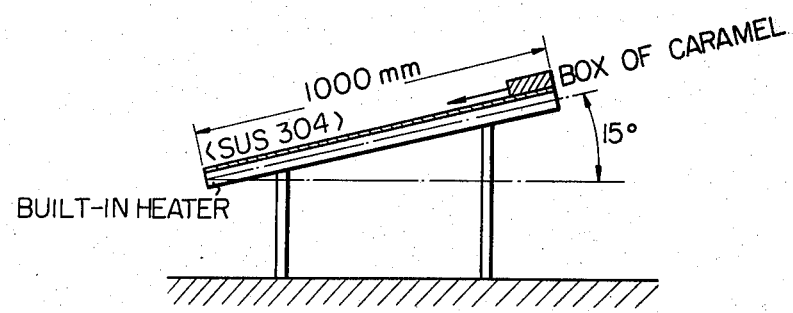
FIG. 2 shows a schematic view of the apparatus used for carrying out the experiments to evaluate the suitability for the high speed packaging using the composite film of the present invention.

The apparatus used for carrying out the above experiment is as shown in FIG. 2.

(9) Corona treatment level (Wetting tension dyne/cm)

The wetting tension was determined by the methods defined in ASTM D-2578-67 and JIS K-6768 using the mixture of formamide and ethyl-cellosolve.

COMPARATIVE EXAMPLES 1–4

A uni-axially oriented polypropylene sheet 235 microns thick was prepared by orientating an isotactic polypropylene resin (MFI=2.0) having incorporated therein 0.1% by weight of stearic amide (as a lubricant), 0.1% by weight of silica having an average particle size of 3 microns (as an anti-blocking agent) and 0.5% by weight of alpha-fatty acid monoglyceride of 95% or higher purity (as an anti-static agent) to five times its original length, using a T-die sequentially orientating machine.

On one surface of each of the four samples taken out of the above-mentioned polypropylene sheet, one of the following four resin compositions (1)–(4) was coated.

(1) ethylene-butene copolymer resin (density 0.89 g/cm$^2$, MI=4.0 at 190° C. butene-1 content 10 mol%), single substance;

(2) a composition comprising 100 parts by weight of the same ethylene-butene resin as in (1), 0.4% by weight of oleic amide as a lubricant, and 0.2% by weight of silica (an average particle size of 2.5 microns) as an anti-blocking agent;

(3) a composition comprising 50 parts by weight of the same ethylene-butene resin as in (1), 50 parts by weight of a medium density polyethylene (density 0.942 g/cm$^3$, MI=12 at 190° C.), 0.4% by weight of oleic amide, and 0.2% by weight of silica (having an average particle size of 2.5 microns); and (4) a composition comprising 60 parts by weight of the same ethylene-butene resin as in (1), 40 parts by weight of an ethylene-propylene copolymer resin (ethylene content: 4% by weight, MFI=7), 0.2% by weight of the same oleic amide as mentioned above, and 0.1% by weight of silica. Thus, four laminated films each having a lamination layer 35 microns thick on its substrate layer were obtained and then each of the resulting laminated films was transversely stretched to 9 times its original (unstretched) width (in the direction perpendicular to the direction in which said base sheet was stretched) to obtain the final product of a composite film 30 microns thick. Each composite film was then subjected to corona treatment on the non-laminated side surface of the composite film to obtain a surface tension of the treated surface of 40 dynes/cm.

Various characteristic properties of these four films were measured in the way explained hereinbefore in detail. The results are shown in Table 1.

EXAMPLES 1-4

(Working Examples of the present invention)

(Hereinafter merely referred to as Example)

Onto one surface (laminated side) of each of the uni-axially oriented films prepared as in Comparative Examples 1-4, a 20% by weight solution of oleic amide (having 18 carbon atoms, a melting point of 72° C. and a molecular weight of 281.5) in isopropanol was coated using the Myer bar (wire thickness 2/1000–10/1000 inches) to provide a coating of oleic amide of 1.0 g/m$^2$ (bone dry weight) before the coated film was stretched to 9 times its original width in the direction perpendicular to the direction in which said base sheet was stretched to obtain a final product of a composite film 30 microns thick. The characteristic properties of these films were measured as mentioned in Comparative Example 1-4. The results are shown in Table 1.

COMPARATIVE EXAMPLES 5-8

A uni-axially stretched film 153 microns thick was prepared by orientating the same polypropylene resin composition of MFI=2.0 as mentioned in Comparative Examples 1-4 using the T-die sequentially orientating machine to 5 times its original length. Onto both side surfaces of each of the four film samples taken from said uni-axially oriented film, one of the ethylene-butene resin compositions (1)-(4) mentioned in Comparative Examples (1)-(4) was coated to provide on each side surface of the film a lamination layer 13.5 microns thick followed by orientating the resulting laminated film to 9 times the width of its uni-axially oriented state in the direction perpendicular to the first orientating of said base sheet to obtain composite films each having the final film thickness of 20 microns. No corona treatment was given to these films. The characteristic properties of these films were measured as in Comparative Examples 1-4 and the results are shown in Table 1.

The conditions for the production of the composite films mentioned in the above comparative and working examples are given in Table 1 together with the physical properties of the same films.

As is obvious from the results given in Table 1, the composite films obtained in Examples 1-8 by laminating on one or both surfaces of the uni-axially oriented polypropylene substrate film the laminating resin followed by coating thereon the isopropanol solution of oleic amide and then orienting the resulting composite film in the direction perpendicular to the direction in which the substrate sheet was oriented show remarkably improved characteristic properties as compared with the composite films obtained in Comparative Examples 1-8 by laminating on the polypropylene substrate film the single substance of ethylene-butene resin or the resin composition comprising the ethylene-butene resin and various incorporated additives or the other resin composition comprising the polyolefinic resin in addition to the ethylene-butene resin and the various additives and then stretching the resulting composite film.

By the above-mentioned sequential treatment according to the present invention, the lubricity, anti-blocking properties and anti-scratch properties of the resulting films can be remarkably improved without losing the intrinsic advantageous properties of the polypropylene films such as transparency, heat sealability and the like. It is noteworthy to point out that the above-mentioned improvement which can be considered as a result of the sequential coating and orientating treatments is more remarkable when the improved laminating resin comprising the blend of ethylene-butene resin, additives and the polyolefin resin is used.

COMPARATIVE EXAMPLES 9-10

A uni-axially oriented laminated sheet was prepared from a resin composition having the same component resins and the same additives all in the same proportions as in Comparative Example 7 by the same film-making process as in Comparative Example 7. Onto each of the two sample films taken out of the uni-axially oriented laminated sheet prepared by the method as mentioned above, a 10-50% by weight solution of stearic amide (a saturated primary higher fatty acid amide having 18 carbons, a melting point of 109° C. and a molecular weight of 286.5) in n-butanol (dissolved by heating to 110° C.) was coated by a gravure roll coating method using a 50–200 mesh gravure roll to provide a coating layer of the bone dry weight of (1) 0.05 g/m$^2$ and (2) 10.0 g/m$^2$, respectively, followed by secondly orientating each of the thus coated sheets in the direction perpendicular to the first orientation.

EXAMPLES 9-24

Six composite films were prepared in the same manner as in Comparative Examples 9-10 except that the coatings of the stearic amide on bone dry weight were (1) 0.1 g/m$^2$; (2) 0.3 g/m$^2$; (3) 1.0 g/m$^2$; (4) 3.0 g/m$^2$; (5) 5.0 g/m$^2$; and (6) 7.0 g/m$^2$, respectively.

COMPARATIVE EXAMPLES 11-12

The composite films were prepared in the same manner as in Comparative Examples 9-10 except that a solution of erucic amide (an unsaturated primary higher fatty acid amide having 22 carbons, a melting point of 84° C. and a molecular weight of 337.6) in isopropanol (heated to 85° C.) was used instead of the solution of stearic amide in n-butanol.

EXAMPLES 15-20

Composite films were prepared in the same manner as in Examples 9-14 except that a solution of erucic amide in isopropanol (heated to 85° C.) was used instead of the solution of stearic amide in n-butanol.

COMPARATIVE EXAMPLES 13-14

Composite films were prepared in the same manner as in Examples 9-14 except that a solution of N,N'-ethylene-bis-stearic amide (an N-substituted higher fatty acid amide having 38 carbons, a melting point of 146° C., and a molecular weight of 593) in xylene (heated to 150° C.) instead of the solution of stearic amide in n-butanol was used.

EXAMPLES 21–26

Composite films were prepared in the same manner as in Examples 9–14 except that a solution of N,N'-ethylenebis-stearic amide in xylene (heated to 150° C.) was used instead of the solution of stearic amide in n-butanol.

The conditions for preparation and physical properties of the composite films obtained in these Comparative and Working Examples are summarized in Table 2 and FIG. 1.

As shown in Table 2 and FIG. 1, the advantage of using a high fatty acid amide is the most remarkable when erucic amide (an unsaturated primary higher fatty acid amide) is used (Curve A). The use of stearic amide (saturated primary higher fatty acid amide) (Curve B) and N,N'-ethylenebis-stearic amide (N-substituted higher fatty acid amide) (Curve C) are next most advantageous in this order. In any of the above cases, the application at a rate of 0.05 g/m² does not provide a substantial advantage, and the application at a rate of 10.0 g/m² or higher severely impairs the transparency of the film, and the application in the range of 0.1–0.3 g/m² or 5.0–7.0 g/m² does not give the characteristics suitable for high speed packaging operation. From these results, it is clear that the optimum coating amount is within the range of 0.3–5.0 g/m².

EXAMPLE 27

The same coating solution as in Example 3 was applied by the same manner as in Example 3 to both surfaces of the same uni-axially oriented film as in Comparative Example 3 each coating being 1.0 g/m² on the bone dry weight, followed by orientating the coated uni-axially oriented film in the direction perpendicular to the first orientation.

EXAMPLE 28

On both surfaces of the same uni-axially oriented film as in Comparative Example 7, the same coating solution as in Example 7 was coated in the same manner as in Example 7 each coating being 1.0 g/m² on the bone dry weight followed by orientating the coated uni-axially oriented film in the direction perpendicular to the first orientation.

EXAMPLE 29

On the upper (laminated) side surface of the same uni-axially oriented film as in Comparative Example 7, a 20% by weight solution of mixed oleic and stearic amides (mixing ratio=50/50) in n-butanol (heated to 110° C.) was coated to provide a coating on the bone dry solid basis of 1.0 g/m², followed by orientating the coated uni-axially oriented film in the direction perpendicular to the first orientation.

The conditions for production and physical properties of the composite films to be obtained in the above Examples are summarized in Table 3.

As is obvious from Table 3, there is no significant difference in the improvement of suitability for high speed packaging between one side coated and both side coated films, although some difference is recognized with respect to only the coefficients of dynamic friction and the anti-scratch properties. In addition, as is obvious from Examples 3 and 7, it has been observed that even in the case of one side coating the surface properties of the uncoated side surface are also substantially improved. Accordingly, it is clear that the same degree of improvement as in the case of both side coating can be expected even by one side coating, and in general one side coating is always satisfactory except only for the special cases in which a particularly high degree of anti-scratch properties or particularly high degree of lubricity is required.

COMPARATIVE EXAMPLES 15–17

On one side of each of the three composite films prepared in the same manner as in Comparative Example 7, a solution of erucic amide in isopropanol (heated to 85° C.) was coated by using the Myer bar 2/1000 in wire diameter to provide the coatings (1) 0.005 g/m², (2) 0.01 g/m² and (3) 0.05 g/m², each bone dry weight. The above-mentioned coating amounts were determined as the presumed approximate thicknesses of the coatings after bi-axial orientation. The coating operations were carried out by controlling the concentrations of the coating solutions. The films after coating were placed in the bone dry atmosphere at 40° C. for 10 minutes.

COMPARATIVE EXAMPLES 18–20

The composite films were coated in the same manner as in Comparative Examples 15–17 except that a solution of N,N'-ethylene-bis-stearic amide in xylene (heated to 150° C.) was used instead of the solution of erucic amide in isopropanol.

The preparing conditions and physical properties of the composite films obtained according to the above Comparative Examples are summarized in Table 2.

The results of Comparative Examples 15–20 in Table 2 show that it is possible to improve lubricity, anti-blocking properties and scratch resistance of the composite films to the same degree as in Examples 15–19 and 21–25, by the method of applying the coating layer to each of the composite films in the step other than the step of making films. However, in these cases, the increase in haze caused by the applied coating is so noticeable that the product films almost lose value as merchandize. It may be possible to find out some means for avoiding the increase in haze even in the cases of Comparative Examples 15–20 without losing the generally ensured improvements in the characteristic properties such as lubricity, anti-blocking properties and scratch resistance. But such process will not be free from the problems of the proper coating technique and the cost increase. Thus, in any case, it must be difficult to obtain the improved composite films having well balanced improved characteristic properties by the process as in Comparative Examples 15–20 which include a separate step for the application of such a coating layer as mentioned above.

COMPARATIVE EXAMPLE 21

On both surfaces of a non-oriented film 765 microns thick prepared from the same polypropylene resin composition and the same laminating resin composition each containing the same kinds and the same amounts of additives as in Comparative Example 7 by melt extruding using the aforementioned T-die orientating machine and cooled with the aforementioned chilled roll, lamination layers each 67.5 microns thick were laminated on each surface of the film and the laminated sheet thus made was uni-axially oriented to 5 times its original length followed by orientating to 9 times its original width in the direction perpendicular to the first orientation to provide the final composite film 20 microns thick.

EXAMPLE 30

On the upper (laminated) surface of the same nonoriented laminated sheet as in Comparative Example 21, a coating layer of oleic amide was given followed by bi-axially orientating the coated film. The amount of oleic amide coated was such that after uni-axial orientation to 5 times its original length, the coating rate of 1.0 g/m$^2$ (which is the same level as in Example 7) would be obtained. The coating was carried out by using a Myer bar 8/1000 inch and a 30% by weight solution of oleic amide in isopropanol (heated to 75° C.) to ensure the final coating (on bone dry weight) of 5.0 g/m$^2$.

The preparing conditions and physical properties of the composite films obtained by the above Comparative and Working Examples are summarized in Table 4.

Table 4 shows that by coating oleic amide on the surface of the non-oriented sheet and then orientating the sheet as explained hereinabove, results similar to those of the Examples given in Tables 1 and 2 can be obtained.

In the case of Comparative Example 21, a laminating resin adhered to the surface of a heating roll in the step of uni-axial orientation which followed the laminating step, and as a result a change in haze was caused and the appearance of the final product film was impaired. In contrast, in the case of Example 30, the coated fatty acid amide was brought in contact with the heated roll and there was some adhesion of said amide to the surface of the roll. But, this adhered portion of the fatty acid amide seemed to act as a releasing agent, and accordingly, there was no substantial adhesion of the laminating resin to the roll. The surface conditions of the film were improved without impairing the appearance of the final film product.

EXAMPLE 31

To examine the maintaining ability of the above-mentioned advantages brought about by said coating, the high speed packaging suitability (or high speed lubricity) was measured with respect to the product films before and after washing with acetone at room temperature. The high speed lubricity is given by the number which shows how many times the sample could repeat sliding at a satisfactory speed from top to bottom along the surface of the inclined plate. The results are shown in Table 5. From these experimental results, it has turned out that the degree of maintenance of the improved lubricity obtained according to the present invention by the sequential treatments: coating of a higher fatty acid amide and the succeeding orientation is extremely better than the composite films as shown in Comparative Examples 7 and 8, although the latter composite films have also been improved to a certain degree. The best improvement is obtained when unsaturated amides which generally possess good lubricity are selectively used, as shown in Examples 7 and 8. The second and the third best improvements are obtained when saturated amide (as in Example 11), and N-substituted amides (as in Example 23), are used, respectively. In the cases of Comparative Examples 17 and 20 wherein the coating is given to the film in the step different from the step of film preparation, the maintenance (ability of maintaining preferred characteristic properties) is poorer than in the case of the present invention wherein the composite film is coated and then oriented. These results also clearly show how excellent is the process of the present invention which comprises the steps of coating and the succeeding orientation to improve the surface characteristic properties of the films.

EXAMPLE 32

With respect to the films of the above Comparative and Working Examples, anti-static properties which were important from the viewpoint of high speed packaging suitability were measured. Then, the test for overwrapping commercially available cigarettes in boxes was carried out using films each 118 mm wide and 300 m long taken out of the rolled films, using Type W-37 automatic wrapping machine available from TOKYO JIDO KIKAI KK, at a rate of 130 boxes/min. The results are shown in Table 6. The composite films prepared in the same manner as in Comparative Example 7 and Example 7, respectively, except that no additive were added to the substrate polypropylene resin layers were identified as the films of Comparative Example 22 and of Example 33, respectively.

EXAMPLE 35

The film samples were prepared in the same manner as in Example 7 except that a solution of said anti-static agent (alpha-fatty acid monoglyceride/oleic amide (50/50 mixture) in isopropanol (heated to 70° C.) was coated instead of the coating solution of oleic amide as in Example 7. The same measurements as in Example 34 were repeated.

EXAMPLE 36

The same coating solution as used in Example 35 was coated on the upper surface of the laminated film as used in Comparative Example 22, followed by making a film. The evaluations were conducted in the same way as in Example 34.

Table 1

| Ex. No. | Laminating Resin | | | | | Surface laminated |
|---|---|---|---|---|---|---|
| | E/B (part) | MDPE (part) | E/P (part) | Oleic Amide (wt.%) | Silica (wt.%) | |
| Comp. Ex. 1 | 100 | | | | | one |
| Comp. Ex. 2 | 100 | | | 0.4 | 0.2 | one |
| Comp. Ex. 3 | 50 | 50 | | 0.4 | 0.2 | one |
| Comp. Ex. 4 | 60 | | 40 | 0.2 | 0.1 | one |
| Ex. 1 | 100 | | | | | one |
| Ex. 2 | 100 | | | 0.4 | 0.2 | one |
| Ex. 3 | 50 | 50 | | 0.4 | 0.2 | one |
| Ex. 4 | 60 | | 40 | 0.2 | 0.1 | one |
| Comp. Ex. 5 | 100 | | | | | both |
| Comp. Ex. 6 | 100 | | | 0.4 | 0.2 | both |
| Comp. Ex. 7 | 50 | 50 | | 0.4 | 0.2 | both |
| Comp. Ex. 8 | 60 | | 40 | 0.2 | 0.1 | both |
| Ex. 5 | 100 | | | | | both |
| Ex. 6 | 100 | | | 0.4 | 0.2 | both |
| Ex. 7 | 50 | 50 | | 0.4 | 0.2 | both |
| Ex. 8 | 60 | | 40 | 0.2 | 0.1 | both |

Table 1-continued

| Ex. No. | Orientation Magnification (times) | Final thickness (micron) | Corona treatment (dyne/cm) | Coefficient[1] of dynamic friction | Blocking[2] strength (kg/15 cm²) |
|---|---|---|---|---|---|
| Comp. Ex. 1 | 9 | 30 | 40 | 1.0 or more | 5.0 or more |
| Comp. Ex. 2 | 9 | 30 | 40 | 0.9-1.0 or more | 3.0-4.0 |
| Comp. Ex. 3 | 9 | 30 | 40 | 0.6-0.7 | 1.0-2.0 |
| Comp. Ex. 4 | 9 | 30 | 40 | 0.6-0.7 | 1.0-2.0 |
| Ex. 1 | 9 | 30 | 40 | 0.2-0.25 | 0.05-0.10 |
| Ex. 2 | 9 | 30 | 40 | 0.14-0.16 | 0.05-0.10 |
| Ex. 3 | 9 | 30 | 40 | 0.08-0.10 | 0.05 or less |
| Ex. 4 | 9 | 30 | 40 | 0.08-0.10 | 0.05 or less |
| Comp. Ex. 5 | 9 | 20 | none | 1.0 or more | 5.0 or more |
| Comp. Ex. 6 | 9 | 20 | none | 0.6-0.7 | 3.0-3.5 |
| Comp. Ex. 7 | 9 | 20 | none | 0.3-0.4 | 1.0-2.0 |
| Comp. Ex. 8 | 9 | 20 | none | 0.3-0.4 | 1.0-2.0 |
| Ex. 5 | 9 | 20 | none | 0.15-0.18 | 0.05-0.10 |
| Ex. 6 | 9 | 20 | none | 0.10-0.13 | 0.05-0.10 |
| Ex. 7 | 9 | 20 | none | 0.05-0.08 | 0.05 or less |
| Ex. 8 | 9 | 20 | none | 0.05-0.08 | 0.05 or less |

Table 1-continued

| Ex. No. | Reel-up[1] blocking strength (class) | Scratch[1] resistance in change of haze (%) | Haze of film (%) | Heat-sealing[2] strength (at 95° C.) |
|---|---|---|---|---|
| Comp. Ex. 1 | 4 | 30-35 | 1.5 | 800 or more |
| Comp. Ex. 2 | 3 | 50-55 | 2.5 | 800 or more |
| Comp. Ex. 3 | 2 | 40-45 | 3.0 | 600-700 |
| Comp. Ex. 4 | 2 | 40-15 | 3.0 | 600-700 |
| Ex. 1 | 1-2 | 10-15 | 1.5 | 800 or more |
| Ex. 2 | 1 | 10-15 | 2.7 | 800 or more |
| Ex. 3 | 1 | 5-10 | 2.8-3.2 | 600-700 |
| Ex. 4 | 1 | 5-10 | 2.5-3.0 | 600-700 |
| Comp. Ex. 5 | 5 | 20-30 | 2.5 | 800 or more |
| Comp. Ex. 6 | 4 | 40-45 | 3.8 | 800 or more |
| Comp. Ex. 7 | 2 | 30-35 | 4.0 | 600-700 |
| Comp. Ex. 8 | 2 | 25-30 | 4.0 | 600-700 |
| Ex. 5 | 1-2 | 8-10 | 2.3-3.6 | 800 or more |
| Ex. 6 | 1 | 8-10 | 3.7-4.0 | 800 or more |
| Ex. 7 | 1 | 3-5 | 4.0-4.2 | 600-700 |
| Ex. 8 | 1 | 3-5 | 4.1-4.3 | |

Notes: When one surface only was laminated:
[1]Laminated surface x. Non-laminated surface (Corona treatment was give to the polypropylene layer)
[2]Laminated surface x. Laminated surface
When both surfaces were laminated:
[1]&[2]Upper side laminated surface x. lower side laminated surface.

Table 2

| Example No. | Higher fatty acid amide | Amount coated (g/m²) | Coefficient[1] of dynamic friction | Blocking[1] strength (kg/15 cm²) | Scratch resistance in change of haze (%) | Haze of film (%) | High speed packaging suitability |
|---|---|---|---|---|---|---|---|
| Comp. Ex. 19 | Stearic amide | 0.05 | 0.3-0.4 | 1.0-2.0 | 30-35 | 4.0 | x |
| Ex. 19 | Stearic amide | 0.1 | 0.2-0.25 | 0.3-0.5 | 25-30 | " | x-Δ |
| Ex. 10 | Stearic amide | 0.3 | 0.13-0.15 | 0.05-0.10 | 10-15 | " | O-Δ |
| Ex. 11 | Stearic amide | 1.0 | 0.10-0.12 | 0.05-0.10 | 3-5 | " | ◎ |
| Ex. 12 | Stearic amide | 3.0 | 0.08-0.11 | 0.05-0.10 | 3-5 | " | ◎ |
| Ex. 13 | Stearic amide | 5.0 | 0.08-0.11 | 0.05-0.10 | 3-5 | " | ◎ |
| Ex. 14 | Stearic amide | 7.0 | 0.07-0.10 | 0.05-0.10 | 3-5 | 4.5 | O-Δ |
| Comp. Ex. 10 | Stearic amide | 10.0 | 0.07-0.10 | 0.05-0.10 | 3-5 | 12.5 | x |
| Comp. Ex. 11 | Erucic amide | 0.05 | 0.3-0.4 | 1.0-2.0 | 30-35 | 4.0 | x |
| Ex. 15 | Erucic amide | 0.1 | 0.15-0.20 | 0.2-0.4 | 25-28 | " | Δ |
| Ex. 16 | Erucic amide | 0.3 | 0.12-0.14 | 0.05-0.10 | 8-12 | " | O |
| Ex. 17 | Erucic amide | 1.0 | 0.10-0.12 | 0.05 | 3-5 | " | ◎ |
| Ex. 18 | Erucic amide | 3.0 | 0.05-0.10 | " | 3-5 | " | ◎ |
| Ex. 19 | Erucic amide | 5.0 | 0.05-0.10 | " | 3-5 | " | ◎ |
| Ex. 20 | Erucic amide | 7.0 | 0.05-0.10 | " | 3-5 | 4.6 | O-Δ |
| Comp. Ex. 12 | Erucic amide | 10.0 | 0.05-0.10 | 0.05 | 3-5 | 13.0 | x |
| Comp. Ex. 13 | N,N'-ethylene-bis-stearic amide | 0.05 | 0.3-0.4 | 1.0-2.0 | 30-35 | 4.0 | x |
| Ex. 21 | N,N'-ethylene-bis-stearic amide | 0.1 | 0.25-0.30 | 0.2-0.4 | 25-30 | " | x |
| Ex. 22 | N,N'-ethylene-bis-stearic amide | 0.3 | 0.20-0.25 | 0.05-0.10 | 10-15 | " | Δ-O |
| Ex. 23 | N,N'-ethylene-bis-stearic amide | 1.0 | 0.15-0.18 | 0.05-0.10 | 3-5 | " | O |
| Ex. 24 | N,N'-ethylene-bis-stearic amide | 3.0 | 0.12-0.15 | 0.05-0.10 | " | 4.5 | ◎ |
| Ex. 25 | N,N'-ethylene-bis-stearic amide | 5.0 | 0.10-0.13 | 0.05-0.10 | " | 4.5 | ◎ |
| Ex. 26 | N,N'-ethylene-bis-stearic | 7.0 | 0.10-0.13 | 0.05-0.10 | " | 6.0 | Δ |
| Comp. Ex. 14 | N,N'-ethylene-bis-stearic amide | 10.0 | 0.10-0.13 | 0.05-0.10 | " | 15.0 | x |

Table 2-continued

| Example No. | Higher fatty acid amide | Amount coated (g/m²) | Coefficient[1] of dynamic friction | Blocking[1] strength (kg/15 cm²) | Scratch resistance in change of haze (%) | Haze of film (%) | High speed packaging suitability |
|---|---|---|---|---|---|---|---|
| Ex. 15 | Erucic amide | 0.005 | 0.10-0.12 | 0.05 | " | 6.5 | O |
| Comp. Ex. 16 | " | 0.01 | 0.05-0.10 | " | " | 8.3 | O |
| Comp. Ex. 17 | " | 0.05 | 0.05-0.10 | " | " | 12.5 | O |
| Comp. Ex. 18 | N,N'-ethylene-bis-stearic amide | 0.005 | 0.12-0.15 | " | " | 8.5 | O |
| Comp. Ex. 19 | N,N'-ethylene-bis-stearic amide | 0.01 | 0.10-0.13 | " | " | 13.5 | O |
| Comp. Ex. 20 | N,N'-ethylene bis-stearic amid | 0.05 | 0.10-0.13 | " | " | 15.6 | O |

Notes (1) Upper side laminated surface x. Lower side laminated surface.

Table 3

| Example No. | Higher fatty acid amide coated | Amount coated (g/m²) | Surface laminated | Surface coated | Coefficient of dynamic friction (1) | Coefficient of dynamic friction (2) | Blocking[3] strength (kg/15 cm²) | Change of haze (Scratch resistance) (%) | High speed packaging suitability (4) | High speed packaging suitability (5) |
|---|---|---|---|---|---|---|---|---|---|---|
| Comp. Ex. 3 | | | one | | 0.5-0.6 | 0.3-0.4 | 1.0-2.0 | 40-45 | Δ | X |
| Ex. 3 | Oleic amide | 1.0 | one | laminated surface | 0.2-0.25 | 0.08-0.10 | 0.05 or less | 5-10 | ◎ | ◎ |
| Ex. 27 | Oleic amide | 1.0 | one | laminated surface | 0.08-0.10 | 0.08-0.10 | 0.05 or less | 2-4 | ◎ | ◎ |
| Comp. Ex. 7 | | | both | | 0.3-0.4 | 0.3-0.4 | 1.0-2.0 | 30-35 | X | X |
| Ex. 7 | Oleic amide | 1.0 | both | laminated surface (one) | 0.08-0.10 | 0.1-0.15 | 0.05 or less | 3-5 | ◎ | ◎ |
| Ex. 28 | Oleic amide | 1.0 | both | laminated surface (both) | 0.08-0.10 | 0.08-0.10 | 0.05 | 1-2 | ◎ | ◎ |
| Ex. 29 | Oleic amide + Stearic amide | 1.0 | both | laminated surface (one) | 0.08-0.10 | 0.1-0.15 | 0.05 or less | 3-5 | ◎ | ◎ |

Notes:
When one surface only was laminated:
(1) Non-laminated surface x. Non-laminated surface
(2) Laminated surface x. Laminated surface
(3) Non-laminated surface x. Laminated surface
(4) Non-laminated surface
When both were laminated:
(1) Laminated (upper) surface x. Laminated (upper) surface
(2) Laminated (lower) surface x. Laminated (lower) surface
(3) Laminated (upper) surface x. Laminated (lower) surface
(4) Laminated (upper) surface
(5) Laminated (lower) surface

Table 4

| Example No. | Lamination Surface | Lamination Thickness (μ) | Orientation Magnification | Orientation Final thickness (μ) | Corona | Coefficient of dynamic friction | Blocking strength (kg/15 cm²) | Scratch resistance in change of haze (%) | Haze (%) | Heat-sealing strength (g/25 mm) |
|---|---|---|---|---|---|---|---|---|---|---|
| Comp. Ex. 21 | both | each 75 | 5 × 9 | 20 | none | 0.3-0.4 | 1.0-2.0 | 28-33 | 4.0-7.0 | 600-700 |
| Ex. 30 | both | each 75 | 5 × 9 | 20 | none | 0.07-0.10 | 0.05 or less | 3-5 | 4.1 | 600-700 |

Notes: Upper side laminated surface x. Lower side laminated surface.

Table 5

| Example No. | Before washing with acetone Room temp. (20° C.) | Before washing with acetone 80° C. | After washing with acetone Room temp. (20° C.) | After washing with acetone 80° C. |
|---|---|---|---|---|
| Comp. | | | | |
| Ex. 7 | 4 | 0 | 0 | 0 |

Table 5-continued

| | Before washing with acetone | | After washing with acetone | |
|---|---|---|---|---|
| Example No. | Room temp. (20° C.) | 80° C. | Room temp. (20° C.) | 80° C. |
| Comp. Ex. 8 | 4 | 0 | 1 | 0 |
| Ex. 7 | 45 | 6 | 15 | 2 |
| Ex. 8 | 48 | 8 | 20 | 1 |
| Ex. 11 | 35 | 3 | 10 | 0 |
| Ex. 23 | 33 | 3 | 7 | 0 |
| Comp. Ex. 17 | 23 | 2 | 3 | 0 |
| Comp. Ex. 20 | 18 | 1 | 5 | 0 |

Notes: Upper side laminated surface (coated surface) x. Stainless plate for all examples.

Table 6

| Example No. | Anti-static agent in substrate PP (wt.%) | Corona treatment (dyne/cm) | Agent coated | Amount coated (g/m²) | Ratio of electrostatic decay (%) (1) | (2) | Potential of frictional charge (%) (1) | (2) | W-37 Over wrapping suitability (3) |
|---|---|---|---|---|---|---|---|---|---|
| Comp. Ex. 17 | 0.5 | none | | | 22.5 | 50.5 | 400 | 420 | O |
| Ex. 7 | 0.5 | none | Oleic amide | 1.0 | 0.6 | 0.6 | 480 | 600 | ⊙ |
| Comp. Ex. 23 | 0.5 | 38 | | | 55.0 | 90.3 | 210 | 240 | ⊙ |
| Ex. 34 | 0.5 | 38 | Oleic amide | 1.0 | 6.4 | 1.8 | 410 | 550 | ⊙ |
| Comp. Ex. 22 | none | none | | | 0 | 0 | 2,800 | 4,540 | x |
| Ex. 33 | none | none | Oleic amide | 1.0 | 0.6 | 0.6 | 1,000 | 1,210 | O-⊙ |
| Ex. 35 | 0.5 | none | Oleic amide + α-fatty acid monoglyceride | 1.0 | 15.0 | 25.5 | 280 | 410 | ⊙ |
| Ex. 36 | none | none | Oleic amide + α-fatty acid monoglyceride | 1.0 | 8.5 | 1.5 | 800 | 700 | O |
| Comp. Ex. 16 | 0.5 | none | Erucic amide | 0.01 | 0.5 | -0.4 | 1,250 | 1,350 | O |
| Ex. 11 | 0.5 | none | Stearic amide | 1.0 | 0.6 | 0.5 | 510 | 690 | ⊙ |
| Ex. 23 | 0.5 | none | N,N'-ethylene-bis-stearic amide | 1.0 | 0.5 | 440 | 800 | | ⊙ |

Notes: (1) Upper side laminated layer
(2) Lower side laminated layer
(3)
⊙:Very good
O:Practically no problem
x:Poor The conditions for the production of the composite films and the physical properties thereof in the above-mentioned Comparative and Working Examples are as shown in Table 6.

As is obvious from this table, if an anti-static agent is incorporated in the polypropylene resin substrate layer in an amount of 0.5% by weight, the anti-static properties of that film is satisfactory (as is clear from the results of Comparative Examples 17 and 23), but substantial picking-up (or dragging) appears in the process of transporting packages and some packages are found to be unsatisfactorily tight probably due to unsatisfactory lubricity of the packaging films. In contrast, in the case of Examples 7 and 34, troubles such as the picking-up, unsatisfactory tightness and the like as seen in Comparative Examples 7 and 23 do not occur, and it is found that the films have stable packaging suitability. This is because in the cases of Examples 7 and 34 the composite films have a continuous layer of an amide on the surface of each film, said continuous layer being formed by coating a higher fatty acid amide and then stretching the coated layer together with the composite film. Because of the thus formed continuous layer of amide, the anti-static agent incorporated in the film does not bleed to the surface of the film, and as a result, the coefficient of friction on the surface of the film remarkably decreases, though the ratio of electrostatic decay decreases. Thus, the amount of charge caused by friction of contacting surfaces is small and in addition, the lubricity of the film as it goes through is very good. In case no anti-static agent is incorporated in the substrate of polypropylene resin, the anti-static properties are poor as is obvious from the results of Comparative Example 22. However, as is obvious from Example 33, the lubricity of the surface of the film is remarkably improved, and for this reason, the electrostatic charge potential caused by friction is low and the packaging suitability is such that the occurrence of picking-up is not frequent and is almost on the same level as in Comparative Example 7 or less. It has also been found that good results can be obtained even by coating a mixture of an amide and an anti-static agent, as is shown in Examples 35 and 36. In those Examples, fatty acid monoglycerides are used as of anti-static agent, although those compounds are not too good as an anti-static agent. Accordingly, it is expected that if better anti-static agents such as betain-type, amine-type and the like, much better improvement can be obtained.

Printing test

Using the formed films prepared according to the processes as in Comparative Examples 3 and 7 and 23, and Examples 3, 7 and 23, and the ink for non-corona treated polypropylene films such as, for example, PALDIC available from DAINIPPON INKI KAGAKU CO., LTD., and the ink for corona treated polypropylene films such as, for example, PPST, New-Piro ST; available from TOYO INKI CO., LTD.: PANASIA SL-PR available from DAINIPPON INKI KAGAKU KOGYO CO., LTD., selected from the generally used inks for polypropylene films, white solid printing was carried out according to the usual gravure printing method, and then the adhesion of ink was examined by scratching test methods. As a result of this experiment, it was found that all of the above-mentioned composite films exhibited satisfactory results. That is, there was no adverse effect resulting from the application of the coating of the higher fatty acid amide.

Automatic Packaging test

The composite films having on one surface a heat sealable resin prepared by the methods as described in Comparative Examples 1–4, and Examples 1–4, the test for automatically packaging "ready-to-eat noodle" was carried out by using a horizontal type pillow packaging machine (PW-R2 type available from TOKIWA KOGYO CO., LTD.) at a high speed of 230 bags per minute. Whichever composite film was used, both center seal and top seal were within the range of 100°–130° C. (measured), and a good seal free from buckling was obtained, the sealing strength being within the range of 800–1000 g/25 mm. However, the packages using the films of Comparative Examples 1–4 were found to possess poor scratch resistance and accordingly scratches were caused by the content "ready-to-eat noodle" on the surface of heat sealing and the appearance and transparency decreased. In contrast, the packages prepared by using the films obtained in Examples 1–4 had only slight scratches caused by the same content. Accordingly, they were found to have good appearance and transparency.

Automatic packaging test

The automatic packaging test for overwrapping box of caramel was made using the films obtained in Comparative Example 7 and Example 8 (a film having a heat sealable resin lamination layers on both surfaces thereof) using an W-323 type packaging machine available from TOKYO JIDO KIKAI CO., LTD. at a high speed of 250 boxes per minute. Both body-seal and top-and-bottom-seal were 120°–130° C. (measured), and a good seal free from buckling was obtained, with the sealing strength being within the range of 300–600 g/25 mm. When the packaging was conducted using film obtained in Comparative Example 7, many scratches caused by the passing roller, etc. were observed. The sliding on the stainless plate after passing through the packaging step was not good, and piling up of the packages was observed. When the film of Example 7 was used, no such trouble was observed and good packages were obtained.

What we claim is:

1. A low temperature heat-sealable bi-axially oriented polypropylene composite film which comprises:
   (a) a substrate layer comprising a bi-axially oriented polypropylene film;
   (b) a uni-axially or bi-axially oriented lamination layer or layers comprising ethylene-butene copolymer or a resin mixture comprising ethylene-butene copolymer laminated on at least one surface of said substrate layer; and
   (c) a uni-axially or bi-axially oriented extremely thin continuous layer of a primary higher fatty acid amide or an N-substituted higher fatty acid amide formed through the sequential coating and orientating on at least one of the outer surfaces of the composite film.

2. The composite film of claim 1 characterized in that said composite film is a two-ply laminated film having a lamination layer on only one surface of a substrate polypropylene layer, said two-ply laminated layer being in a total thickness between about 10 and 100 microns, said one laminated layer being between about 0.5 and 10 microns, the polypropylene substrate layer occupying at least 50% of the total thickness of the composite film, the thickness of said extremely thin continuous layer of amide being between about 0.1 and 0.01 micron or less.

3. The composite film of claim 2 characterized in that the total thickness of the composite film is between about 15 and 60 microns and the thickness of the lamination layer is between about 1.0 and 6.0 microns.

4. The composite film of claim 1 characterized in that said composite film is a three-ply laminated film having lamination layers on both surfaces of a substrate polypropylene layer, the total thickness of said three-ply laminated layer being between about 10 and 100 microns, each of said two lamination layers being between about 0.5 and 10 microns, the polypropylene substrate layer occupying at least 50% of the total thickness of the composite film, the thickness of said extremely thin continuous layer of amide being between about 0.1 and 0.01 micron or less.

5. The composite film of claim 4 characterized in that the total thickness of the composite film is between about 15 and 60 microns and the thickness of each of said lamination layers is between about 0.8 and 4 microns.

6. The composite film of claim 1 wherein the heat sealing strength obtained by sealing at 95° C. is between 600 and 800 g/25 mm or higher, the coefficients of both static and kinetic frictions are between 0.05 and 0.20, the blocking strength is 0.10 Kg/15 cm2, no blocking occurs even after 1 month storage either in the state of roll or stacked sheets of film, and the scratch resistance in terms of the change of haze is between 3.0% and 10%.

7. The composite film of claim 1 wherein the amide coated on the surface of the film is a fatty acid amide having the generic formula: $RCONH_2$, wherein R represents $C_nH_{2n+1}$ wherein n is an integer of 13–21, said fatty acid amide having an iodine value of 90 or less, a melting point of 50°–120° C., and the number of carbon atoms is from 14–22, and the molecular weight is from 200–340.

8. The composite film of claim 1 wherein the amide coated on the surface of the film is an N,N'-methylene-bis-amide or an N,N'-ethylene-bis-amide having the generic formula of $(R'CONH)_2CH_2$ or $(R'CONH)_2C_2H_4$, wherein R' represents $C_nH_{2n+1}$, wherein n is an integer of 9–21, said amides having a melting point of 118°–160° C., and the number of carbon atoms is from 21–46, and the molecular weight is from 350–690.

9. A process for the production of low temperature heat-sealable bi-axially oriented polypropylene composite film comprising the steps of laminating ethylene-butene copolymer or a resin mixture comprising ethylene-butene copolymer on at least one surface of a substrate sheet of non-oriented or uni-axially oriented polypropylene to form a corresponding non-oriented or uni-axially oriented composite film, coating on at least one of the outer surfaces of said composite film a solution of a primary higher fatty acid amide or an N-substituted higher fatty acid amide, and then when said coated composite film is non-oriented, bi-axially stretching, heating at a temperature between 130° C. and 180° C. and orienting said non-oriented composite films, and when said coated composite film is uni-axially oriented, stretching, heating at a temperature between 130° C. and 180° C. and orienting said composite film containing the uni-axially oriented polypropylene substrate film in the direction perpendicular to the direction in which said substrate polypropylene film has been oriented, whereby said bi-axially oriented polypropylene composite film having a very thin adherent layer of said amide on at least one surface is produced.

10. The composite film prepared by the process of claim 9.

11. The process of claim 9 wherein the amount of the primary higher fatty acid amide or the N-substituted higher fatty acid amide coated on coated surface of the composite film before the final orientating of the laminated film is within the range of 0.1–7.0 g/m² on a bone dry weight basis.

12. The composite film prepared by the process of claim 11.

13. The process of claim 11 wherein as an amide for coating on the surface of the film at least one member is selected from the group consisting of erucic amide, stearic amide and N,N'-ethylene-bis-stearic amide.

14. The composite film prepared by the process of claim 13.

15. The process of claim 9 wherein the amount of the primary higher fatty acid amide or the N-substituted higher fatty acid amide coated on coated surface after coating and before orientating is within the range of 0.3–5.0 g/m² on a bone dry basis.

16. The composite film prepared by the process of claim 15.

17. The process of claim 15 wherein as an amide for coating on the surface of the film at least one member is selected from the group consisting of erucic amide, stearic amide and N,N'-ethylene-bis-stearic amide.

18. The composite film prepared by the process of claim 17.

19. The process of claim 9 wherein the amide coated on the surface of the film is a fatty acid amide having the generic formula: $RCONH_2$, wherein R represents $C_nH_{2n+1}$ wherein n is an integer of 13–21, said fatty acid amide having an iodine value of 90 or less, a melting point of 50°–120° C., and the number of carbon atoms is from 14–22, and the molecular weight is from 200–340.

20. The composite film prepared by the process of claim 19.

21. The process of claim 9 wherein the amide coated on the surface of the film is an N,N'-methylene-bis-amide or an N,N'-ethylene-bis-amide having the generic formual of $(R'CONH)_2CH_2$ or $(R'CONH)_2C_2H_4$ wherein R' represents $C_nH_{2n+1}$ wherein n is an integer of 9–21, said amides having a melting point of 118°–160° C., and the number of carbon atoms is from 21–46, and the molecular weight is from 350–690.

22. The composite film prepared by the process of claim 21.

23. The process of claim 9 wherein as an amide for coating on the surface of the film at least one member is selected from the group consisting of erucic amide, stearic amide and N,N'-ethylene-bis-stearic amide.

24. The composite film prepared by the process of claim 23.

* * * * *